United States Patent
Stepanek et al.

(10) Patent No.: US 12,341,331 B2
(45) Date of Patent: Jun. 24, 2025

(54) METHODS AND SYSTEMS FOR MANAGING AN INSULATION FAULT IN AN ELECTRICAL INSTALLATION

(71) Applicant: Schneider Electric Industries SAS, Rueil Malmaison (FR)

(72) Inventors: Jiri Stepanek, Saint Martin d'Heres (FR); Henricus David Stokman, Aalsmeer (NL)

(73) Assignee: Schneider Electric Industries SAS

( * ) Notice: Subject to any disclaimer, the term of this patent is extended or adjusted under 35 U.S.C. 154(b) by 339 days.

(21) Appl. No.: 18/080,209

(22) Filed: Dec. 13, 2022

(65) Prior Publication Data

US 2023/0187921 A1    Jun. 15, 2023

(30) Foreign Application Priority Data

Dec. 15, 2021    (FR) ...................................... 2113587

(51) Int. Cl.
*H02H 3/00*    (2006.01)

(52) U.S. Cl.
CPC .................................... *H02H 3/00* (2013.01)

(58) Field of Classification Search
CPC .......... H02H 3/00; H02H 3/021; H02H 3/025; H02H 3/027; H02H 3/04; H02H 3/06; H02H 3/063; H02H 3/08; H02H 3/162; H02H 3/20; H02H 3/26; H02H 3/34
See application file for complete search history.

(56) References Cited

U.S. PATENT DOCUMENTS

| | | | |
|---|---|---|---|
| 2007/0008666 A1* | 1/2007 | Morita | B60L 3/0069 361/42 |
| 2012/0314327 A1 | 12/2012 | Liu et al. | |
| 2015/0288167 A1 | 10/2015 | Stepanek et al. | |
| 2016/0336732 A1* | 11/2016 | Hackl | H02H 3/165 |
| 2018/0115152 A1 | 4/2018 | Gupta et al. | |
| 2020/0110125 A1* | 4/2020 | Lehnhardt | G01R 31/1245 |

FOREIGN PATENT DOCUMENTS

| | | |
|---|---|---|
| CN | 112640238 A | 4/2021 |
| EP | 3289653 A1 | 3/2018 |

OTHER PUBLICATIONS

French Search Report and Written Opinion dated Aug. 1, 2022 for corresponding French Patent Application No. FR 2113587, 7 pages.

* cited by examiner

*Primary Examiner* — Nguyen Tran (74) *Attorney, Agent, or Firm* — Troutman Pepper Locke LLP (57) ABSTRACT

A system for managing an insulation fault in an electrical installation includes a monitoring device, measuring devices configured to measure an electrical quantity in the installation, and switches controlled by the monitoring device. The monitoring device is configured to: detect a first insulation fault in the installation; detect a second insulation fault in the installation; and automatically control one of the switches associated with output terminals so as to open in order to eliminate one of the detected electrical faults, the switch to be opened being chosen depending on the location of the detected insulation faults and on predefined control laws making it possible to disconnect only some of the electrical loads.

10 Claims, 4 Drawing Sheets

METHODS AND SYSTEMS FOR MANAGING AN INSULATION FAULT IN AN ELECTRICAL INSTALLATION

TECHNICAL FIELD

The present invention relates to methods and devices for managing an insulation fault in an electrical installation, notably in an electricity distribution installation.

The invention is particularly applicable to electrical installations in which the electrical phases and the neutral line are not connected to earth (for example, installations using an earth connection system of the IT type).

BACKGROUND

In such installations, use is commonly made of a detection system designed to detect and locate insulation faults caused by one of the phases (or the neutral line) being unexpectedly earthed.

In practice, when such an insulation fault occurs in an isolated manner, this fault does not always create an immediate risk for the installation, and therefore it is not always necessary to interrupt the operation of the whole installation, as long as no other insulation fault appears. The installation may continue to operate until the fault is located and an operator can be sent to the location to eliminate the problem responsible for the fault. However, if a second insulation fault occurs while the first insulation fault is present, then it is essential to take action to eliminate at least one of the insulation faults immediately.

In present-day installations, the electrical loads of the installation are protected by protection devices, such as circuit breakers or fuses, which disconnect all the electrical loads when a second fault is detected.

This has the drawback that the power supply to all the electrical loads is interrupted, even for electrical loads that were unaffected by the electrical fault. This causes the shut-down of the whole installation and makes it impossible to ensure any continuity of service, which may be harmful in some applications, notably in installations in the industrial or service sectors.

SUMMARY

The invention is intended, in particular, to remedy these drawbacks by proposing methods and devices for managing an insulation fault in an electrical installation in such a way as to maintain the safety of the installation while ensuring a satisfactory quality of service.

To this end, an aspect of the invention relates to a system for managing one or more insulation faults in an electrical installation, the electrical installation comprising a power supply, a power conversion device, and power supply lines configured to supply electrical loads with power, each power supply line being connected to an output terminal of the power conversion device, chosen from among a first output terminal, a second output terminal and an intermediate output terminal, the system comprising a monitoring device, measuring devices configured to measure an electrical quantity in the installation, and switches controlled by the monitoring device, the monitoring device being configured to:
  detect a first insulation fault in the installation;
  detect a second insulation fault in the installation;
  automatically control one of the switches associated with the output terminals so as to open in order to eliminate one of the detected electrical faults, the switch to be opened being chosen depending on the location of the detected insulation faults and on predefined control laws making it possible to disconnect only some of the electrical loads.

According to some advantageous but non-mandatory aspects, such a detection method may incorporate one or more of the following features, taken alone or in any technically permissible combination:
  the monitoring device is configured so that, if the first insulation fault is detected on the intermediate output terminal and if the second insulation fault is detected on the first output terminal or on the second output terminal, the switch corresponding to this other output terminal is disconnected in order to eliminate the second insulation fault, without opening the switch associated with the intermediate output terminal;
  the monitoring device is configured so that, if the first insulation fault is detected on the first output terminal or on the second output terminal, the switch corresponding to the output terminal for which the first fault has been detected is opened, by means of the switch, regardless of the location where the second insulation fault is detected;
  the monitoring device is configured so that, if the first insulation fault and the second insulation fault occur on the first output terminal and the second output terminal, and if the intermediate output terminal is not affected by any insulation fault, the output terminal having the lower priority between the first output terminal and the second output terminal is disconnected, in order to eliminate the insulation fault associated with this output terminal, in such a way that the other output terminal can be kept connected, without the disconnection of the intermediate output terminal;
  the monitoring device is configured so as to automatically detect the first insulation fault and the second insulation fault in the installation on the basis of the measurements supplied by the measuring devices;
  the monitoring device is configured so as to automatically detect the first insulation fault and the second insulation fault in the installation on the basis of the measurements supplied by a permanent insulation monitor connected to the installation;
  the monitoring device is configured to prevent the disconnection of the intermediate output terminal.

According to another aspect, the invention relates to an electrical distribution installation comprising a power supply, a power conversion device, and power supply lines configured to supply electrical loads with power, each power supply line being connected to an output terminal of the power conversion device, chosen from among a first output terminal, a second output terminal and an intermediate output terminal, the system comprising a monitoring device as described above.

According to another aspect, the loads having a higher priority are connected between the intermediate output terminal and one or other of the first and second output terminals.

According to another aspect, the invention relates to a method for managing an insulation fault in an electrical installation, the electrical installation comprising a power supply, a power conversion device, and power supply lines configured to supply electrical loads with power, each power supply line being connected to an output terminal of the power conversion device, chosen from among a first output terminal, a second output terminal and an intermediate output terminal, the system comprising a monitoring device, measuring devices configured to measure an electrical quantity in the installation, and switches controlled by the monitoring device, the method comprising the steps of:
  detecting a first insulation fault in the installation;
  detecting a second insulation fault in the installation;
  automatically controlling one of the switches associated with the output terminals so as to open in order to eliminate one of the detected electrical faults, the switch to be opened being chosen depending on the location of the detected insulation faults and on predefined control laws making it possible to disconnect only some of the electrical loads.

BRIEF DESCRIPTION OF THE DRAWINGS

The invention will be more readily understood and other advantages of the invention will be more clearly apparent in the light of the following description of an embodiment of a method for detecting an insulation fault in an electrical installation, provided solely by way of example, with reference to the attached drawings, in which.

DETAILED DESCRIPTION

Figure 1:
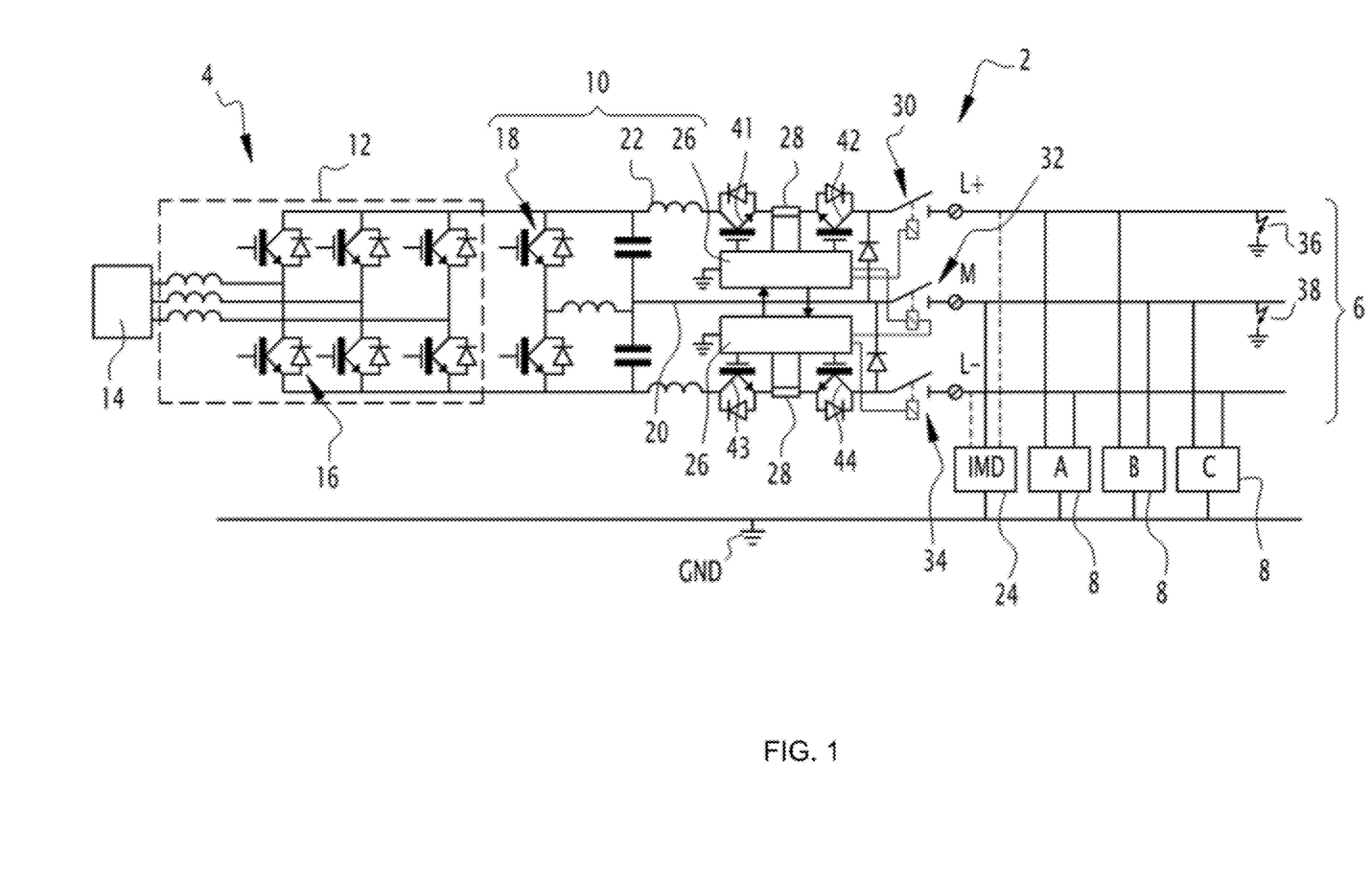
FIG. 1. is a simplified diagram of an electrical installation comprising a system for detecting an insulation fault according to a first embodiment of the invention.

FIG. 1 shows schematically an electrical installation 2, such as an electricity distribution system.

The installation 2 is supplied by a power source 4.

The installation 2 comprises a plurality of power supply lines 6, such as electrical conductors, for supplying power to one or more electrical loads 8. For example, the electrical loads 8 are connected to the power supply lines 6 by means of connections or tappings.

In many examples, the electrical loads 8 are electric motors, or industrial machines, or heating systems, although these examples are not limiting. The installation 2 may also be used for supplying power to infrastructures or to a site of critical importance such as a hospital or a complex industrial installation.

Preferably, in the installation 2, the power supply lines electrical 6 are not connected to earth, or are connected with a controlled impedance in normal operating conditions. Such an installation 2 is said to have an IT-type earthing system.

In the example shown in FIG. 1, there are three electrical loads 8. This example is not limiting, and a different number of electrical loads 8 could be used. Here the electrical loads 8 are identified individually by the references A, B and C.

In numerous embodiments, the installation 2 is a direct-current (DC) installation.

To simplify the explanation, the following description refers primarily to a direct-current installation 2, although there is no reason why the installation 2, in a variant, should not be an alternating-current installation, and notably a polyphase installation, as will be described below.

Preferably, the installation 2 has a bipolar configuration and comprises, at the output, a first output terminal L+, a second output terminal L−, and an intermediate output terminal M, or mid-point M, which is, for example, connected between the first terminal L+ and the second terminal L−. Therefore, the installation 2 comprises, at its output, three power supply lines 6, each connected to one of the output terminals L+, L− and M.

For example, the first output terminal L+ is brought to a first electrical potential (for example, +350 volts). The second output terminal L− is brought to a second electrical potential, preferably opposite to that of the first electrical potential (−350 volts, for example). The mid-point M is brought to an electrical potential that is intermediate between the first electrical potential and the second electrical potential (0 volts, for example). In a variant, the electrical potentials could be chosen differently (between +700 volts and −700 volts, for example). In another variant, the electrical potentials could be multipolar (+350 volts, −350 volts, +700 volts and −700 volts, for example).

Each of the electrical loads 8 is connected to two of the output lines 6, depending on the voltage to be supplied to them, but also depending on their degree of importance, as will be apparent from the following description. Preferably, the most critical loads have a connection to the mid-point M (or, more precisely, to the power supply line 6 connected to the mid-point M).

Here the phrase "degree of importance, or criticality" refers to the fact that some electrical loads must be supplied for as long as possible, even if an incident occurs, for example because they are more important than other electrical loads 8 of the installation 2.

In the illustrated example, the load A is connected between the first output terminal L+ and the second output terminal L−. The load B is connected between the first output terminal L+ and the mid-point M. The load C is connected between the second output terminal L− and the mid-point M. This example is not limiting, and other configurations could be used in variants.

Preferably, the critical loads 8 are connected via at least one of their terminals to the intermediate power supply line 6, that is to say the power supply line 6 associated with the intermediate output terminal M. The other terminal of each of these critical loads 8 is then connected to the other output terminal L+ or L−. The non-critical loads 8, for their part, are connected between the first output terminal L+ and the second output terminal L−. In the illustrated example, the loads B and C are critical loads, while the load A is a non-critical load. It is also possible to assign a higher priority to one of the first and second output terminals L+ and L− than to the other terminal.

The electrical loads 8 are preferably also connected to an electrical ground GND (or earth) of the installation 2.

The installation 2 also comprises a power conversion device (or "mid-point converter") 10 connected between the power supply 4 and the output lines 6.

For example, the power conversion device 10 is a DC-DC power converter.

In the illustrated example, the source 4 comprises a rectifier 12 connected to an upstream alternating voltage source 14, such as an electrical distribution network (mains). In a variant, the alternating voltage source 14 could be a generator or an energy storage device, or any appropriate source.

For example, the rectifier 12 is a switch-mode rectifier and comprises a plurality of power switches 16, such as transistors, controllable by an electronic controller, although other variant embodiments are possible.

The device 10 comprises, for example, power switches 18, such as transistors, connected between terminals of the power supply 4 and a mid-point 20 which is connected to the intermediate output terminal M.

The device 10 may also comprise elements 22 configured to condition the currents and/or voltages delivered by the power supply 4, such as an LC filter.

The installation 2 comprises an insulation monitoring device (IMD) 24, also called a permanent insulation monitor 24.

The monitoring device 24 is configured to detect an insulation fault, notably an insulation fault caused by one of the phases (or the neutral line) being unexpectedly earthed. For example, the monitoring device 24 comprises a measuring device for measuring a fault impedance linking the monitored load or loads 8 to earth GND, or more precisely a fault impedance linking the power supply lines 6 connecting this electrical load 8 to earth.

For example, the monitoring device 24 is connected to earth GND and to at least some of the power supply lines 6.

For example, in the example shown in FIG. 1, one of the terminals of the monitoring device 24 is connected to the power supply line 6 that is connected to the mid-point M. The other terminal of the monitoring device 24 is connected to the power supply line 6 that is connected to the first output terminal L+ (high line) or to the power supply line 6 that is connected to the second output terminal L− (low line), as shown by the broken lines in FIG. 1.

Such monitoring devices 24 are known and are not detailed further.

The installation 2 also comprises a monitoring device 26 configured to detect and/or locate an insulation fault, for example by means of measuring devices 28, such as voltage and/or current sensors. The measuring devices 28 are configured to measure an electrical quantity in the installation, such as a current or a voltage, notably in the power supply lines 6.

The monitoring device 26 is also configured to disconnect one or more of the power supply lines 6 in order to eliminate an electrical fault, for example by means of switches 41, 42, 43, 44, 30, 32 and 34 associated with the power supply lines 6. For example, first switches 30, 32 and 34 are associated with the output terminals L+, L− and M. Advantageously, second switches 41, 42, 43, 44, such as solid-state switches, may be associated with the corresponding outputs of the power conversion device 10.

Preferably, the monitoring device 26 operates in combination with the monitoring device 24. In a variant, the monitoring device 26 may operate independently of the monitoring device 24.

In the illustrated example, the switches 41, 42 are associated with the first output terminal L+. The switches 43, 44 are associated with the second output terminal L+. The switches 30, 32 and 34 are associated, respectively, with the first output terminal L+, with the intermediate output terminal M and with the second output terminal L−.

Each of the switches 41, 42, 43, 44, 30, 32 and 34 is controlled by the monitoring device 26 and may be switched between a closed state, in which the corresponding power supply line 6 (and the load 8 connected to it) is supplied with power, and an open state, in which the corresponding power supply line 6 (and the load 8 connected to) is disconnected.

The switches 30, 32 and 34 may be electromechanical switching devices, or semiconductor power switches such as power transistors or thyristors or any similar element, or a combination of these elements.

The second switches 41, 42, 43 and 44 may be electromechanical switching devices, or semiconductor power switches such as power transistors or thyristors or any similar element, or a combination of these elements.

The second switches 41, 42, 43 and 44 can facilitate the switching of the current. When the second switches 41, 42, 43 and 44 are used in combination with the first switches 30, 32 and 34, the first switches 30, 32 and 34 may be disconnectors.

In a variant, the second switches 41, 42, 43 and 44 may be omitted. The disconnection of one or more of the output terminals L+, L− and M and of the corresponding power supply lines 6 is carried out by the first switches 30, 32 and 34 only. In this case, preferably, the first switches 30, 32 and 34 are circuit breaker/disconnectors.

For example, a first measuring device 28 is associated with the "high" power supply line corresponding to the first output terminal L+ and a second measuring device 28 is associated with the "low" power supply line corresponding to the second output terminal L−, although other variant configurations are possible.

For example, the monitoring device 26 comprises an electronic control device including a processor such as a programmable microcontroller or a microprocessor. The processor is coupled to a computer memory or to any computer-readable data recording medium comprising executable instructions and/or a software code. In a variant, the monitoring device 26 may comprise a signal processing processor (DSP), or a reprogrammable logic component (FPGA), or an application-specific integrated circuit (ASIC), or any equivalent element, or any appropriate electronic circuit.

In the illustrated example, the monitoring device 26 comprises two processors coupled to each other, each being connected to a measuring device 28. However, in numerous variants, this arrangement could be replaced by a single processor.

For example, the monitoring device 26, the measuring devices 28 and the switches 41, 42, 43, 44, 30, 32 and 34 form an electrical protection system for managing insulation faults in the installation 2 while ensuring the correct operation of the loads 8, notably by prioritizing the most critical loads 8 when a part of the installation has to be disconnected in case of multiple insulation faults.

In general terms, the monitoring device 26 is programmed so that, when insulation faults occur in the installation 2, at least some of the electrical loads 8 are disconnected, while the power supply to at least some of the electrical loads 8 is allowed to continue, as far as is possible.

Two insulation faults are shown schematically in the example of FIG. 1, namely a first insulation fault 36 on the power supply line 6 associated with the first output terminal L+, and a second insulation fault 38 on the power supply line 6 associated with the intermediate output terminal M (or mid-point M). It is also possible that a fault may be present on the power supply line 6 associated with the second output terminal L−, but for the sake of simplicity this eventuality is not illustrated.

In practice, if a first insulation fault 36 or 38 occurs in an isolated manner, this first fault does not necessarily create any immediate danger for the installation 2, for example because a distribution transformer located upstream of the source 14 is sufficiently insulated from earth.

The monitoring device 26 is therefore programmed not to interrupt the operation of the installation 2 if only a single insulation fault is detected.

The installation may continue to operate until the fault is located and an operator can be sent to the location to eliminate the problem responsible for the fault.

However, if a second insulation fault occurs while the first insulation fault is present, then the monitoring device 26 is configured to actuate one or more of the switches 41, 42, 43, 44, 30, 32 or 34 to eliminate at least one of the insulation faults immediately.

Preferably, the monitoring device 26 is configured so that, in such cases, it controls the switches 41, 42, 43, 44, 30, 32 or 34 according to one or more control laws, to ensure that the non-critical loads 8 are disconnected first and that the critical loads 8 are disconnected as late as possible, or even not disconnected at all if the situation permits.

The manner of detecting an insulation fault is known and is not detailed further. Such faults may be detected, for example, on the basis of electrical measurements made by the measuring devices 28.

The monitoring device 26 may be programmed in the following manner.

According to a first control law, if a first insulation fault is detected on the power supply line 6 connected to the intermediate output terminal M, then, if a second insulation fault is detected on a power supply line 6 connected to another of the output terminals (the first terminal L+ or the second terminal L−), then it is the switch corresponding to the latter terminal that is opened, to disconnect the corresponding power supply line 6, in order to eliminate the second insulation fault.

Thus, if the second fault occurs on the power supply line 6 connected to the first terminal L+, then it is one or more of the corresponding switches 41, 42, 30 that is opened, the other switches 43, 44, 32 and 34 now being closed.

In this way, the load or loads 8 connected between the mid-point M and the other output terminal L− (which is not affected by any insulation fault) continue to be supplied with power by the installation 2 and may continue to be supplied without any risk, since the corresponding loads 8 are affected only by the first insulation fault, not by the second insulation fault.

This enables the operation of at least some of the installation 2 to be prolonged so that the critical loads 8 continue to be supplied, at least temporarily, until the cause of the insulation fault is eliminated by an operator.

Similarly, if the second fault occurs on the power supply line 6 connected to the second output terminal L−, then it is one or more of the corresponding switches 43, 44, 34 that is opened, the other switches 41, 42, 30 and 32 now being closed.

According to a second control law, if the first insulation fault is detected on a power supply line 6 connected to the first output terminal L+ or to the second output terminal L−, then, if a second insulation fault is detected in the installation 2, the monitoring device 26 is programmed to disconnect the power supply line on which the first fault has been detected, by means of the corresponding switch 41, 42, 43, 44, 30 or 34, regardless of the location where the second insulation fault is detected.

For example, if the first fault occurs on the power supply line 6 connected to the first terminal L+, then it is one or more of the corresponding switches 41, 42, 30 that is opened when the second fault is detected, the other switches 43, 44, 32 and 34 now being closed, regardless of where the second fault has been detected.

In this way, once again, the load or loads 8 connected between the mid-point M and the other output terminal L− (which is not affected by any insulation fault) continue to be supplied with power by the installation 2 and may continue to be supplied without any risk, since the corresponding loads 8 are affected only by the first insulation fault, not by the second insulation fault.

Thus, in these control laws, the monitoring device 26 is configured to disconnect the first output terminal L+ or the second output terminal L− as a priority, in order to eliminate one of the two insulation faults, while keeping the intermediate output terminal M (the mid-point M) connected for as long as possible.

This enables an improved continuity of service to be provided, for the reasons explained above.

Another advantage is that, by disconnecting the mid-point last, after the other output terminal or terminals L+ and L−, it is possible to avoid creating excess voltages in the electrical loads 8, which could occur if the mid-point were disconnected first (leaving only the output terminals having the highest potential difference connected).

In a variant, a third control law may be defined for the case where different priorities have been assigned to the first output terminal L+ and the second output terminal L−. The loads having the highest criticality are connected between the mid-point M and the output terminal L+ or L− having the highest priority.

Thus, if the first insulation fault and the second insulation fault occur on the output terminals L+ and L− (that is to say, if the first fault occurs on one or other of the output terminals L+ and L− and the second fault occurs on the other of the output terminals L+ and L−), then the monitoring device 26 is programmed to disconnect the output terminal L+ or L− that has the lowest priority, in order to eliminate the insulation fault associated with this output terminal, so that the other output terminal L+ or L− can be kept connected.

This enables an improved continuity of service to be provided, for the reasons explained above.

Preferably, however, a load 8, even if critical, will be disconnected is there is no other way of preserving the electrical safety of the installation.

Figure 2:
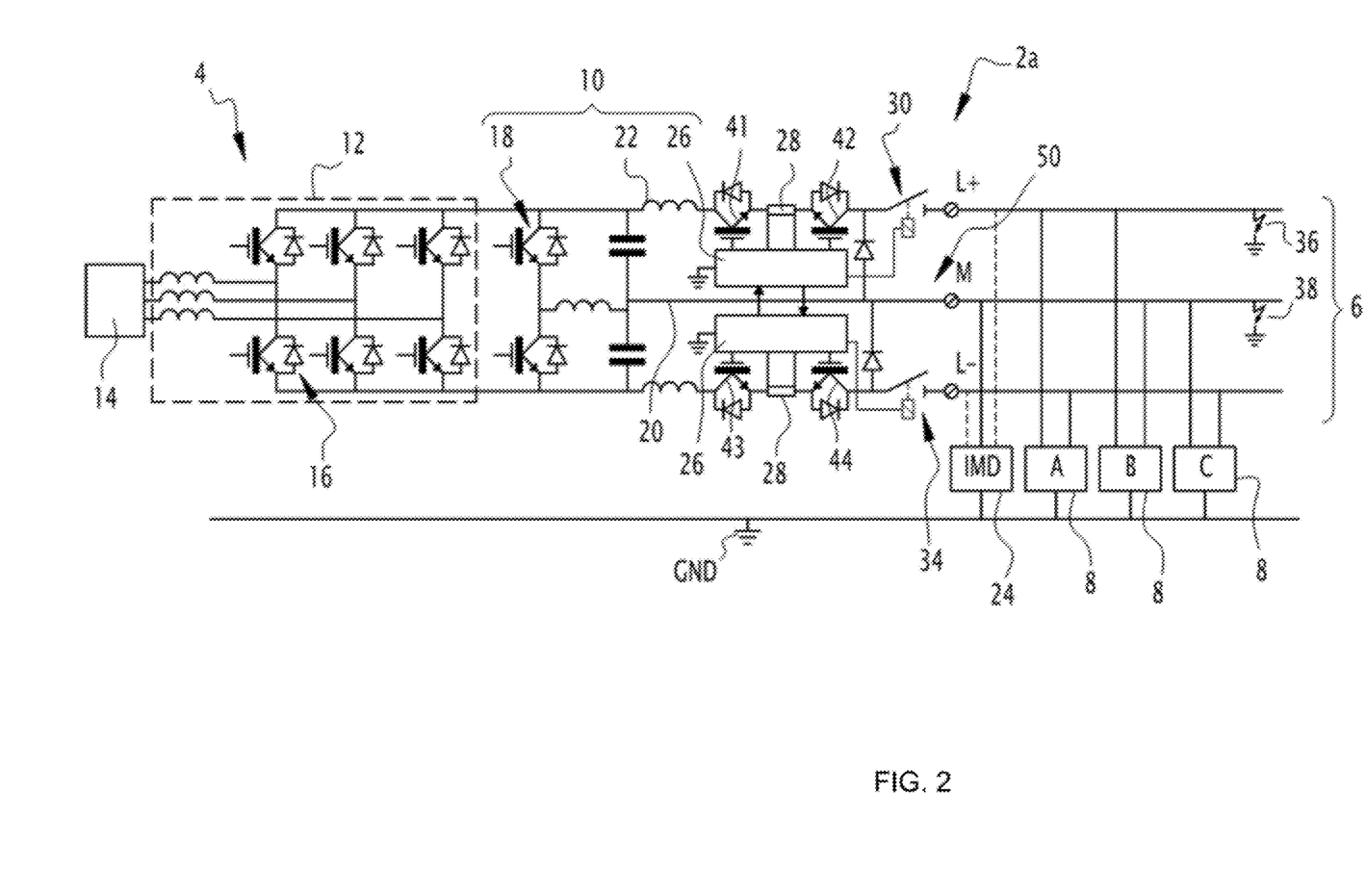
FIG. 2 is a simplified diagram of an electrical installation comprising a system for detecting an insulation fault according to a second embodiment of the invention.

FIG. 2 shows a first variant of the embodiment of FIG. 1.

FIG. 2 shows an electrical installation 2a similar to the installation 2 of FIG. 1, from which it differs, notably, in that the switch 32 associated with the intermediate output terminal M is replaced by an electrical conductor 50.

In other words, the intermediate output terminal M (the mid-point M) cannot be disconnected by the monitoring device 26. This simplifies the implementation of the monitoring device 26 and ensures that the mid-point M cannot be disconnected before the first output terminal L+ or the second output terminal L−.

Alternatively, this configuration could be obtained not by using the electrical conductor 50, but by neutralizing the switch 32 associated with the intermediate output terminal M, for example by programming the monitoring device 36 so that the switch 32 cannot be opened and remains closed.

Thus the monitoring device is configured to prevent the disconnection of the intermediate output terminal M.

This variant is particularly useful for meeting some standards in some countries.

The elements of the electrical installation 2a according to this first variant that are similar to the first embodiment have the same references as in the installation 2, and are not described in detail, since the above description is applicable to them.

Figure 3:
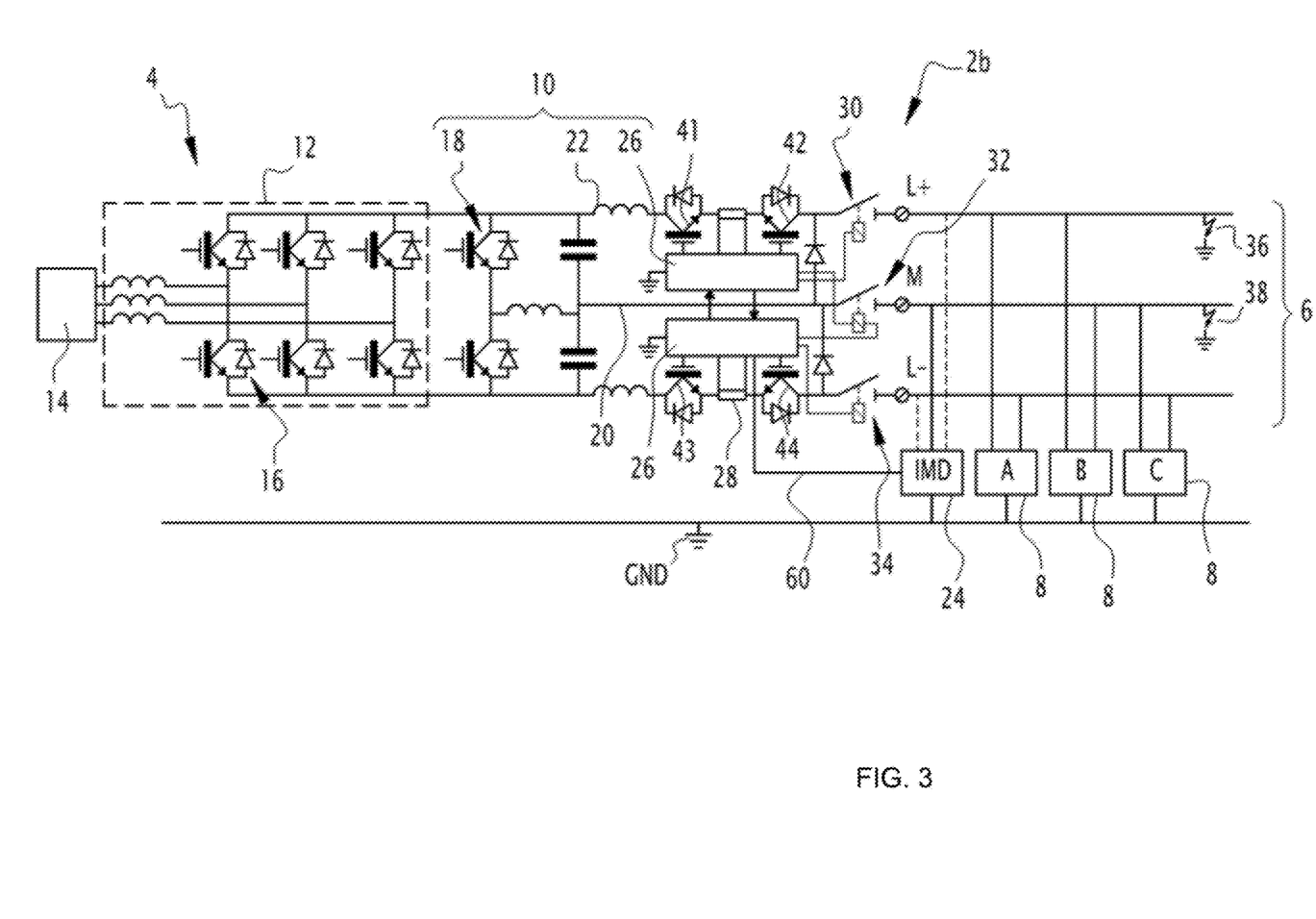
FIG. 3 is a simplified diagram of an electrical installation comprising a system for detecting an insulation fault according to a third embodiment of the invention.

FIG. 3 shows a second variant of the embodiment of FIG. 1.

FIG. 3 shows an electrical installation 2b similar to the installation 2 of FIG. 1, from which it differs, notably, in that the detection and/or location of the insulation faults 36, 38 is carried out by the monitoring device 24, this device then being coupled to the monitoring device 26, for example by means of a data link 60 such as a wired link.

The elements of the electrical installation 2b according to this second variant that are similar to the first embodiment have the same references as in the installation 2, and are not described in detail, since the above description is applicable to them.

Many other embodiments are possible.

In alternative embodiments, the installation could be an alternating current (AC) installation comprising one or more phases. Notably, the installation could be a three-phase installation.

In this case, the rectifier 12 and the structure of the conversion device 10 may be omitted. In these embodiments, there is one output terminal per phase (for example, for each phase, a terminal "L", replacing the first or second terminals L+ and L−) and a neutral terminal corresponding to the mid-point. Thus, in a three-phase system, there are three output terminals (one per phase) and a mid-point associated with the neutral.

The operation of the monitoring device 26 is then adapted accordingly, for example so that it measures information obtained from a plurality of additional measuring devices 28, and controls additional switches 41, 42, 43, 44, 30, 32, 34 associated with these additional output terminals. However, the way in which the switches are controlled according to the predefined control laws is similar or identical to what has been described, the output L associated with each electrical phase being treated independently by the monitoring device 26.

In practice, if a fault appears on a first phase and a second fault appears on a second phase, the control laws are applied in the same way as described above. The monitoring device detects the faults in each of these phases, and disconnects the two phases concerned. Only the third phase and the neutral will continue to be supplied.

Additionally, if the electrical loads 8 are supplied by a plurality of phases and their operation is liable to be disrupted if some of their power supply is lost, it is advantageous to equip some or all of these electrical loads 8 with a relay to provide protection against the loss of a phase on their power supply input. This enables the power supply to the whole of the load 8 to be cut off when only one phase is disconnected. With the polyphase configuration described above, the monitoring device 26 may be instructed to open only one of the phase conductors when insulation faults are detected, thereby leaving the loads 8 concerned still partially connected to the power supply lines 6.

In alternative embodiments, the installation could be of the multipolar type, that is to say supplied with power by a plurality of sources 14.

In this case, each source is preferably equipped with a measuring device 28 and associated switches (41, 42, 43, 44, 30, 32, 34) for each of the active conductors (L+, L−, M, . . . ). The network is also equipped with one or more fault detection devices (24). The measuring devices 28 of the different sources may be interconnected so that they can exchange information on the electrical quantities measured and coordinate their operation.

If a first fault is detected, the installation continues to be supplied with power. If a second fault appears, each of the measuring devices evaluates the information from the current and voltage sensors in order to locate the two faults. If the measuring devices are not interconnected, they must be configured so as to provide the same priority settings for the disconnection of the phases and the associated loads (if phase L+ has a higher priority than phase L−, all the measuring devices are configured accordingly).

If the measuring devices are interconnected, their actions are coordinated in such a way that the opening of the same sources of the same power supply conductor takes place if a second fault is detected.

Figure 4:
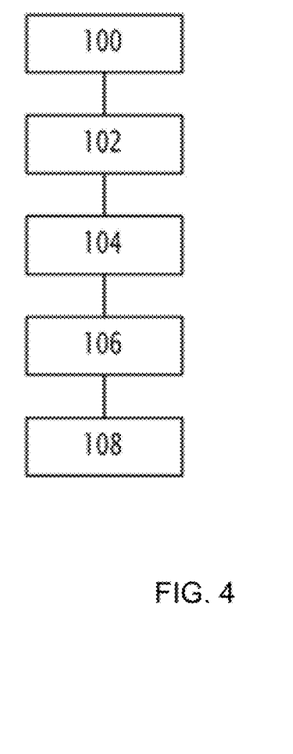
FIG. 4 is a diagram of a method for detecting an insulation fault in the electrical installation of FIG. 1 according to an embodiment of the invention.

An example of the operation of the monitoring device 26 will now be described with reference to the diagram in FIG. 4.

The monitoring device 26 is switched on in a step 100, for example when the installation 2 is started up. At this stage, the installation 2 is supplied with power and has no insulation fault.

In a step 102, a first insulation fault is detected by the monitoring device 26, on the basis of one or more electrical quantities, such as the voltage, measured by the measuring device or devices 28. For example, this detection is carried out according to known methods of detection and analysis, on the basis of the electrical quantities measured by the measuring device or devices 28. In a variant, as explained above, this detection could be at least partially, or even completely, carried out by the monitoring device 24.

For example, the first insulation fault is detected on a power supply line or on an electrical load 8 associated with a power supply line connected to one of the output terminals L+, L− and M.

In a step 104, a second insulation fault is detected by the monitoring device 26, on the basis of one or more electrical quantities, such as the voltage and/or the current and/or the impedance, measured by the measuring device or devices 28. For example, this detection is carried out according to known methods of detection and analysis, on the basis of the electrical quantities measured by the measuring device or devices 28. For example, the second insulation fault is detected on a power supply line or on an electrical load 8 associated with a power supply line connected to one of the output terminals L+, L− and M, but at a different location from the first insulation fault.

In a step 106, the monitoring device 26 automatically controls the opening of one of the switches 41, 42, 43, 44, 30, 32, 34 associated with output terminals L+, L− or M, so as to eliminate one of the detected electrical faults.

The switch to be opened is chosen automatically according to the location of the detected insulation faults and according to predefined control laws.

For example, as explained above, if a first insulation fault is detected on the intermediate output terminal M and the second insulation fault is detected on the first terminal L+ or the second terminal L−, then it is the switch corresponding to this other terminal that is opened to disconnect the corresponding power supply line 6, in order to eliminate the second insulation fault, without disconnecting the intermediate output terminal M.

In another example, if the first insulation fault is detected on the first output terminal L+ or on the second output terminal L−, then, in step 106, the monitoring device 26 disconnects the power supply line on which the first fault has been detected, by means of the corresponding switch 41, 42, 43, 44, 30 or 34, regardless of the location where the second insulation fault is detected.

And, in another example, if the first fault and the second fault occur on the output terminals L+ and L− without affecting the intermediate output terminal M (the mid-point M), then the monitoring device 26 is programmed to disconnect the output terminal L+ or L− that has the lowest priority, in order to eliminate the insulation fault associated with this output terminal, so that the other output terminal L+ or L− can be kept connected, without disconnecting the intermediate output terminal M.

In step 108, following the opening of one of the switches, one of the two insulation faults has disappeared. The installation 2 can continue to operate, at least temporarily, in the absence of a second electrical fault. Some of the electrical loads 8 are disconnected, but others of the electrical loads 8 (preferably, the loads considered to be most critical) continue to be supplied.

However, as a variant, the steps could be executed in a different order. Some steps might be omitted. The described example does not prevent, in other embodiments, other steps from being implemented jointly or sequentially with the described steps.

Any feature of one of the embodiments or variants described above may be implemented in the other described embodiments and variants.

The invention claimed is:

1. A system for managing one or more insulation faults in an electrical installation, the electrical installation comprising a power supply, a power conversion device, and power supply lines configured to supply electrical loads with power, each power supply line being connected to an output terminal of the power conversion device, chosen from among a first output terminal, a second output terminal and an intermediate output terminal, the system comprising a monitoring device, measuring devices configured to measure an electrical quantity in the installation, and switches controlled by the monitoring device, the monitoring device being configured to:
  detect a first insulation fault in the installation;
  detect a second insulation fault in the installation; and
  automatically control one of the switches associated with the output terminals so as to open in order to eliminate one of the detected electrical faults, the switch to be opened being chosen depending on the location of the detected insulation faults and on predefined control laws making it possible to disconnect only some of the electrical loads.

2. The system according to claim 1, wherein the monitoring device is configured so that, if the first insulation fault is detected on the intermediate output terminal and if the second insulation fault is detected on the first output terminal or on the second output terminal, the switch corresponding to this other output terminal is disconnected in order to eliminate the second insulation fault, without opening the switch associated with the intermediate output terminal.

3. The system according to claim 1, wherein the monitoring device is configured so that, if the first insulation fault is detected on the first output terminal or on the second output terminal, the switch corresponding to the output terminal for which the first fault has been detected is opened, by means of the switch, regardless of the location where the second insulation fault is detected.

4. The system according to claim 1, wherein the monitoring device is configured so that, if the first insulation fault and the second insulation fault occur on the first output terminal and the second output terminal, and if the intermediate output terminal is not affected by any insulation fault, the output terminal having the lower priority between the first output terminal and the second output terminal is disconnected, in order to eliminate the insulation fault associated with this output terminal, in such a way that the other output terminal can be kept connected, without the disconnection of the intermediate output terminal.

5. The system according to claim 1, wherein the monitoring device is configured so as to automatically detect the first insulation fault and the second insulation fault in the installation on the basis of the measurements supplied by the measuring devices.

6. The system according to claim 1, wherein the monitoring device is configured so as to automatically detect the first insulation fault and the second insulation fault in the installation on the basis of the measurements supplied by a permanent insulation monitor connected to the installation.

7. The system according to claim 1, wherein the monitoring device is configured to prevent the disconnection of the intermediate output terminal.

8. An electrical distribution installation comprising a power supply, a power conversion device, and power supply lines configured to supply electrical loads with power, each power supply line being connected to an output terminal of the power conversion device, chosen from among a first output terminal, a second output terminal and an intermediate output terminal, the system comprising a monitoring device of the system according to claim 1.

9. The installation according to claim 8, wherein the loads having a higher priority are connected between the intermediate output terminal and one or other of the first and second output terminals.

10. A method for managing one or more insulation faults in an electrical installation, the electrical installation comprising a power supply, a power conversion device, and power supply lines configured to supply electrical loads with power, each power supply line being connected to an output terminal of the power conversion device, chosen from among a first output terminal, a second output terminal and an intermediate output terminal, the system comprising a monitoring device, measuring devices configured to measure an electrical quantity in the installation, and switches controlled by the monitoring device, the method comprising:
  detecting a first insulation fault in the installation;
  detecting a second insulation fault in the installation; and
  automatically controlling one of the switches associated with the output terminals so as to open in order to eliminate one of the detected electrical faults, the switch to be opened being chosen depending on the location of the detected insulation faults and on predefined control laws making it possible to disconnect only some of the electrical loads.

* * * * *